United States Patent
Mercuri

[11] 3,844,944
[45] Oct. 29, 1974

[54] APPARATUS AND METHOD FOR EFFECTING SEPARATIONS

[76] Inventor: Louis Mercuri, 11 Linda St., Newark, Del. 19711

[22] Filed: June 27, 1972

[21] Appl. No.: 266,596

[52] U.S. Cl. .................... 210/73, 210/83, 210/242, 210/DIG. 21
[51] Int. Cl. .............................................. E02b 15/04
[58] Field of Search ....... 210/73, 83, 255, 262, 521, 210/522, 532, 540, DIG. 21, 242

[56] References Cited
UNITED STATES PATENTS

| | | | |
|---|---|---|---|
| 1,442,306 | 1/1923 | Stonebraker | 210/255 |
| 2,345,426 | 3/1944 | Pruiett et al. | 210/540 X |
| 3,443,694 | 5/1969 | Malinovsky | 210/255 |
| 3,651,943 | 3/1972 | DiPerna | 210/242 |

FOREIGN PATENTS OR APPLICATIONS

| 547,608 | 4/1932 | Germany | 210/255 |
|---|---|---|---|

Primary Examiner—John Adee
Attorney, Agent, or Firm—Mortenson & Weigel

[57] ABSTRACT

This invention provides an apparatus for separating a mixture of immiscible liquids. A plurality of containers is provided each of which acts as a separator and each of which receives processed fluid by gravity flow from the container immediately preceding it. In effecting separations, the lighter of the two liquids is allowed to go to the top and the heavier of the liquids, successively containing a lesser amount of the lighter in successive separators, is passed to the next separation container. In the separation chamber, there is a wall that affords an opening near the bottom of the container to allow flow to the next container, each container thus, in effect, having two chambers. The first chamber receives the mixture containing a greater amount of the lighter material and as separation occurs, the second chamber receives a mixture which contains lesser amounts of the lighter material. The second chamber contains an outlet to the separation container next to it which is shorter in height. Thus, the separations and the flows are effected by gravity. The lighter of the immiscible liquids is either skimmed off the top or, when a given separation chamber contains practically all of the lighter material, the lighter material is passed to a separate storage means. This invention is directed towards the recovery of oil in oil spills and the prevention of pollution in streams, lakes and the like.

3 Claims, 6 Drawing Figures

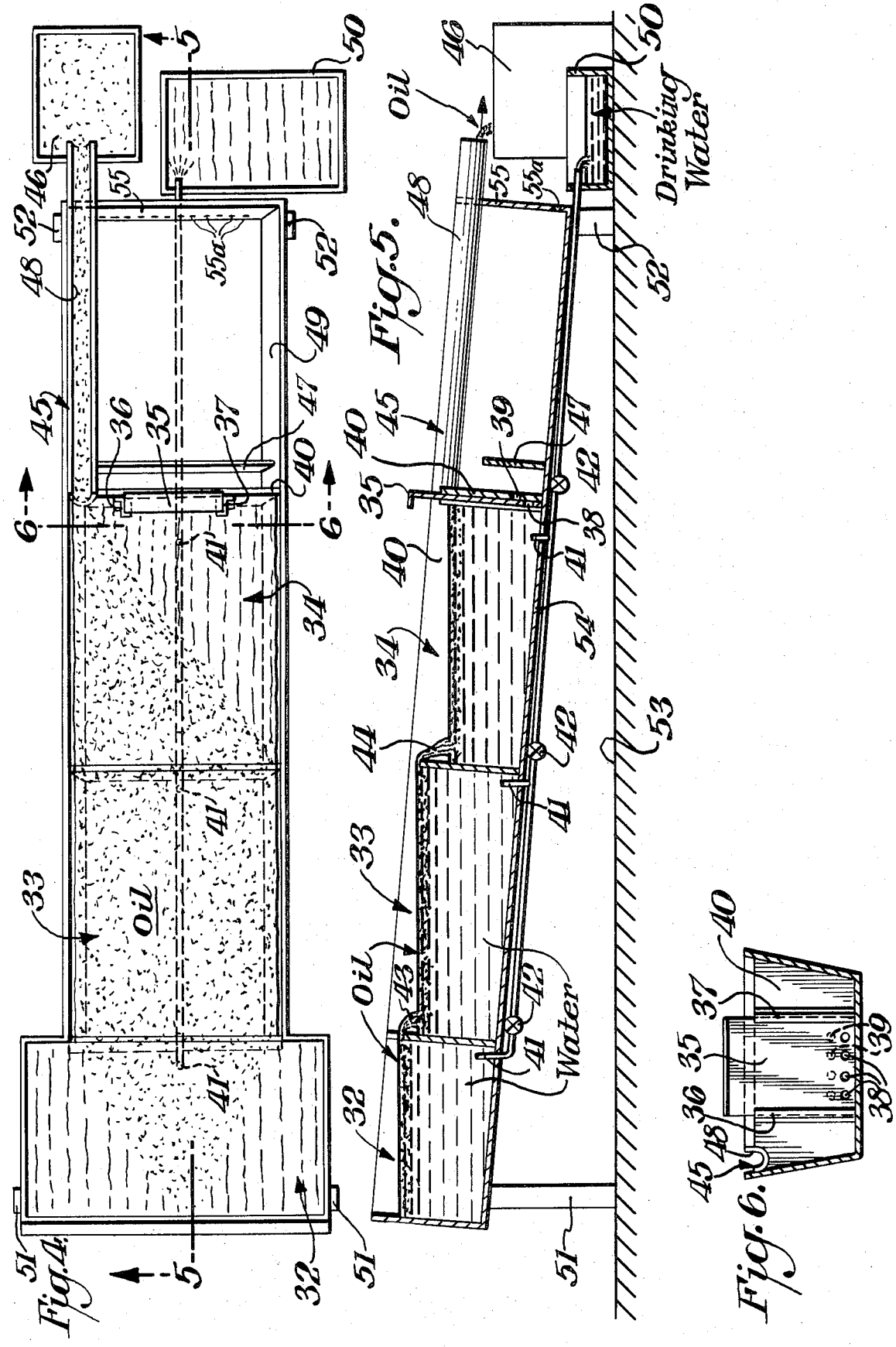

APPARATUS AND METHOD FOR EFFECTING SEPARATIONS

BACKGROUND OF THE INVENTION

As is well known, water is an essential resource and the supply and/or nature of the sources of water are frequently threatened by misuse. One of the more well-known threats is the occurrence of oil or oily materials or similar substances that are immiscible with water which various materials can come from accidental oil spills or from deliberate dumping of materials into rivers and lakes. These polluting materials come from a great variety of places, so that it is very difficult to predict just where the next pollution problem will occur.

There exists a large variety of means for separating oil-and-water mixtures. While certain of these have definite utility, problems arise from the need to process large amounts of water and from the need to effect separations of materials which are substantially dispersed. Another problem is the return of processed water to the original source of the water, such as the sea or river. A still further problem is accomplishing the continued flow of water to a further point of use, as, for example, downstream.

Thus, an objective of this invention is the provision of a method and apparatus for effecting the separation of immiscible materials on a large scale. Another aim is effecting such separations with a minimum of handling of the large amounts of water involved. A still further goal is effecting such separations and the immediate passage of the processed water to its intended use without any substantial hold-up of the water.

SUMMARY OF THE INVENTION

This invention provides a series of separation chambers each of which, in a downstream fashion, is shorter in height or is at a lower point relative to gravity than is its preceding separation chamber. Separations occur in a given chamber and water which has been treated is passed from it to the next lower chamber for further treatment. At each stage the pollutant is removed until potable or pollutant-free water is obtained. The removal of the oil or other pollutant is effected simply by allowing it to flow into the hold of a ship or by passing it to some other reservoir. The water that emerges at the final stage contains little or no oil or other pollutant, and it is allowed to flow directly back into the sea, lake or river in a continuous fashion.

The method and apparatus of this invention provides the separation of oil and water without the use of any counterflowing processes or turbulence effects. The flow of the liquids is in effect in a straight continuous line. There are no reversals of flow nor are any tortuous paths of liquid travel needed. The separation containers are of sufficient size to accommodate large quantities of liquids, and the filling of the initial container and the continuous pumping of materials into it can be at a rate that is commensurate with the separations that are occurring in the successive containers. Visual gauges can be placed on each of the containers to allow ready observation of the status of the mixture in each container, or, alternatively, an operator can use the common dipstick to determine the presence of or the level of oil in the container.

In one form of the invention the series of separation tanks is mobilized, being shown for convenience as part of a ship. This mobile form could also be on wheels or be made stationary for use on land, of course, since oil spills and the like occur at plant sites of various kinds. In another form of this invention the apparatus is shown in a stationary form for purposes of illustration, the particular form being related to use in connection with a stream that is the source of drinking water for a city, for example. Here again, this embodiment can be made portable if desired.

This invention will be further understood by reference to the description and the drawings given below, all of which are given for illustrative purposes only and are not limitative.

FIG. 4 is a plan view of a stationary embodiment of this invention;

FIG. 5 is a cross-section of the stationary separators which view is taken on lines 5—5 of FIG. 4; and FIG. 6 is a cross-sectional view showing the separation area, the view being taken on lines 6—6 of FIG. 4.

Figure 1:
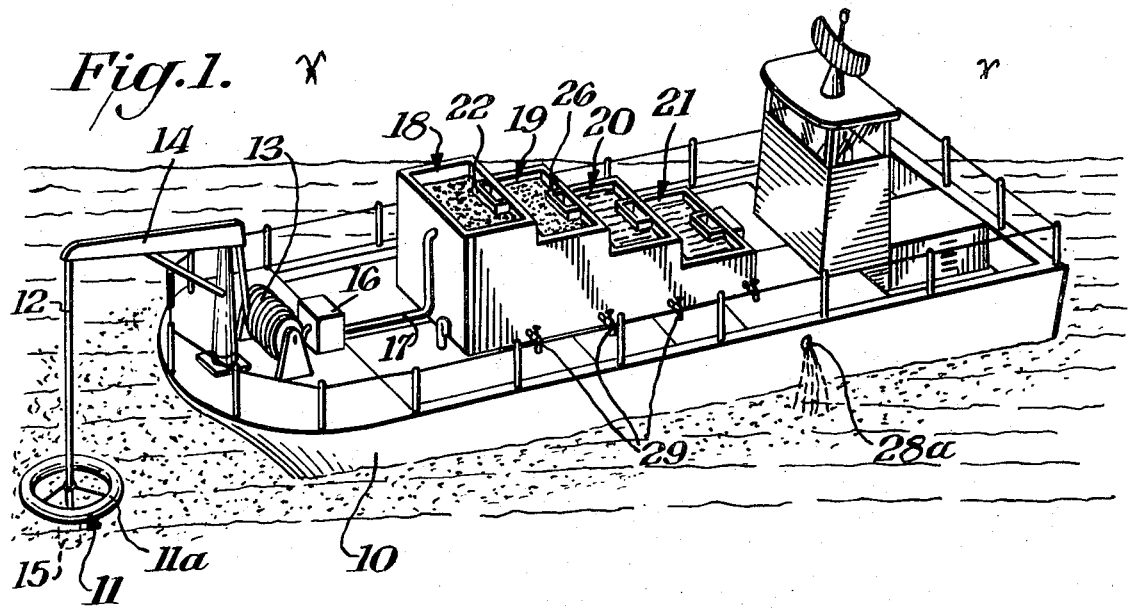
FIG. 1 is a perspective showing a portable modification of this invention mounted on a ship.

As can be seen in FIG. 1, the vessel 10 has at one end a pick-up device 11 which can be any conventional apparatus for pumping of liquids. The particular apparatus shown comprises a flexible hose 12 which is of any length desired and comes off reel 13 and passing through arm support 14 downward to the filter element and place of suction 15, the pumping suction action being supplied by pump 16. The liquid that is pumped through the pick-up device 11, which can be floated by buoy 11a, is sent to the conduit 17 on the outlet side of pump 16, and the liquid passes from that outlet into the first and tallest of the separators 18. As shown in FIG. 1, there are four such separators (18, 19, 20 and 21) all of which are in series and each of which is of a shorter height than the previous separator. The mixture that is pumped through pump 16 can be fed into the first separator 18 at any desired point and is preferably pumped in at or near the top of separator 18. Each of these separators, in effect, acts as a settling tank with the oil rising to the top and the water going to the bottom.

Figure 3:
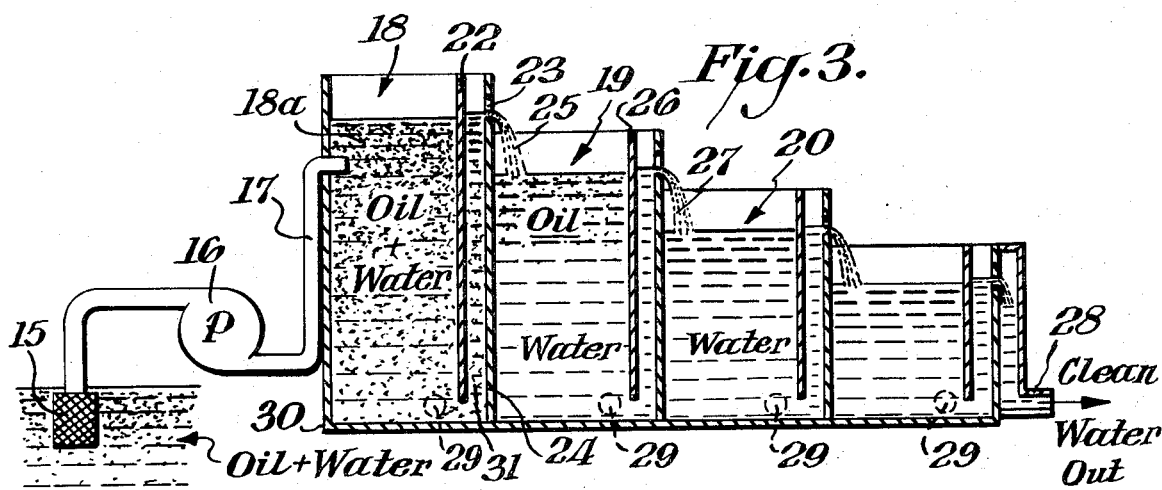
FIG. 3 is taken on line 3—3 of FIG. 2 showing the separators of this invention in cross-section.

As shown in FIG. 3, the first chamber 18 will be primarily, if not entirely, a mixture of oil and water 18a. The baffle or wall 22 prevents the oil-and-water mixture that is initially pumped into container 18 from immediately passing out exit 23 into separator 19. At the same time the liquid flowing up between the baffle 22, which can be stationary or can be raised and lowered like baffle 35 in FIGS. 4–6, and wall 24, which is common to containers 18 and 19, tends to become enriched in water so that the spill-over 25 going into container 19 will contain more water and less oil than is in container 18.

Figure 2:
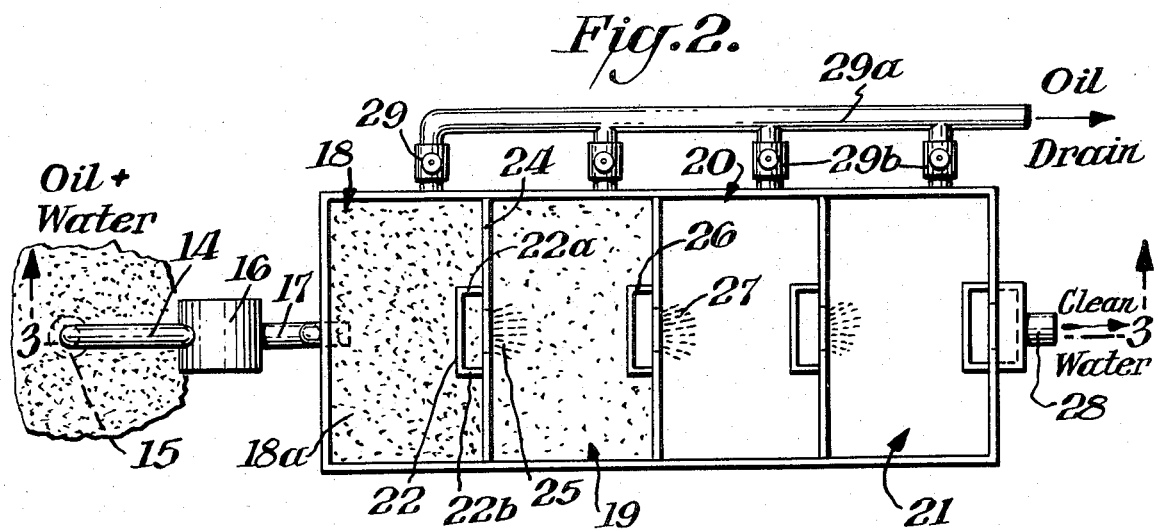
FIG. 2 is a plan view of the series of separators of this invention shown in FIG. 3, given in a compacted version and omitting the ship.

Separator 19 also contains a baffle 26 which functions like baffle 22 so that the spill-over 27 going into container 20 is even more enriched in water. Thus, the separations are effected by natural settling and by gravity flow with substantially clean water coming out the exit at the very end of the series, this exit being designated as 28, or in FIG. 1 as 28a, this being an outlet from ship 10 to pass the water back to the sea, river or lake. At the bottom of each of the separators, outlets 29 (FIG. 1) are provided and these outlets can be actuated by appropriate valves 29b whenever desired to withdraw the materials in each of the separators. Thus, when separators 18 and 19, for example, are substantially full of oil, the oil can be withdrawn and passed into the hold of the ship 10. In FIG. 2, a slight modification is shown, the outlets 29 being placed on the opposite side of the separators and being ganged together by common pipe 29a to feed the oil to a common oil drain or collection means, not shown for convenience.

As also can be seen in FIG. 2, the baffle or barrier 22, and its counterpart in each of the separation vessels, does not have to be a wall spanning the entire length of the separator 18, though it can be, if desired. Conveniently, it is a chamber having three walls (22, 22a and 22b) which are sealed to wall 24, as the fourth wall, the said three terminating just above the bottom 30 of the vessel 18. Thus, the opening 31 is formed. If desired, only one of the said three walls need be short of the bottom of the respective container. In any event, a means affording spill-over of processed liquid to the next separator is provided, and this means allows continuous flow as desired.

A comparable spill-over means is also present in the stationary embodiment shown in FIGS. 4–6. With reference to FIG. 5, it can be seen there that the stationary embodiment is a plurality of separators, 32, 33 and 34, for example. In the last of these chambers, 34, a barrier 35 is shown. This functions substantially in the same way as barriers 22, although, as shown, it is of different construction. Rather than being in fixed position, as is barrier 22, barrier 35 is movable in an up and down fashion. It is slidable in upright supports 36 and 37, shown in FIGS. 4 and 6, so that openings 38 can be raised up to a position where they mesh or are exactly opposite openings 39 in the outermost wall 40 of chamber 34. With barrier 35 in a closed position, oil-and-water mixtures are fed into chamber 32 where separation of oil and water occurs. Water can be withdrawn from the bottom of chamber 32 through outlet 41 upon activation of valve 42, as desired. Similarly, chambers 33 and 34 are equipped with such outlets and valves. Valves 42 are actuated only when clean, oil-free water can be withdrawn from the given separation chamber. Oil is allowed to spill over from chamber 32 at area 43 into chamber 33 and similarly oil spills over from chamber 33 at area 44 into chamber 34.

It is to be noted in FIG. 5 that this stationary embodiment of the apparatus of this invention is positioned on an inclined plane. With the successive separations of oil and water that occur in the passage of the mixtures from chamber to chamber, oil will be skimmed off at the top through runway 45, as shown in FIGS. 4 and 5. This oil can be passed into any appropriate reservoir, stationary or portable, as shown at 46. Of course, it is to be appreciated that at the appropriate time barrier 35 will be raised to cause the meshings of holes 38 and 39, and this action, in effect, affords the formation of an outlet that functions and is comparable to outlet 31 of the portable embodiment of this invention. In order to prevent any great turbulence, a stationary barrier 47 is positioned near and opposite the outlets 39 so that the space between outer wall 40 of the last separation chamber 34 and the barrier 47 will gradually become filled with water and spill-over in a uniform fashion along the entire width of the apparatus, the barrier 47 spanning the walls 48 and 49 as shown in FIG. 4. Water will thus be emptied into vessel 50, flowing through conduits 55a in wall 55 which is not essential but can be used for flow control, as by gates (not shown for convenience) for the conduits.

While the stationary embodiment is shown mounted on supports 51 and 52 in relation to the ground or base 53, it is to be appreciated that the stationary embodiment can be positioned right on the ground in an inclined manner and used in conjunction with a flowing river. To illustrate, certain communities withdraw water from a river at a considerable distance from the community water purification plant, allowing the water to flow into a long mill race where sediment and the like are gradually removed as the water flows slowly towards the purification plant. However, in such communities, if immiscible liquids, such as oils, appear suddenly in the river at a point which is upstream to the inlet to the mill race, these get into the mill race and there is no way of removing them. By positioning the apparatus of this invention upstream and just ahead of and in conjunction with the entrance to the mill race, immiscible liquids can be prevented from getting into the mill race which would, in effect, be represented by vessel 50, the oil passing to a large vat or to portable containers 46 which are separate and to one side of the mill race. In any event, the stationary embodiment of this invention is operated by and through the same principles that are used in the portable embodiment of this invention. Both, in effect, are inclined plane versions or, in other words, both effect skimming off oil at the top and successively passing water, freed completely or at least to some extent, of oil, by gravity to a lower point for further processing. It is also to be appreciated that while the inclined plane version just described is given as a stationary embodiment in a large size for use with rivers or the like, small versions can be built and used in a portable manner. Also, it is to be understood that the portable embodiment shown in FIG. 1 can be very large in size and in a stationary position such as at a refinery or other plant. As can be seen, the first chambers are substantially larger than the second chambers, the volume of latter being generally no more than 10 percent of the former. This allows for build-up of oil in the first chambers and for very little carry over of oil through the second chambers to the successive receptacles.

Further, it is to be understood that separators 32–34, or any one of them, can be equipped with the second chambers shown in FIG. 2 that is, such chambers as formed by baffles or walls 22, 22a and 22b and that, if desired, any of the separators or large containers, such as 18 or 33, can have a plurality of said second chambers. Also, the movable barrier 35 and wall 39 shown in FIG. 5 need not have the conduits or pipes (38, 39) shown since wall 39 can be equipped with a spill-over means at its top such as opening 23 and barrier 35 can be raised to any convenient height forming an opening or passageway like 31 for the water to pass further downstream. However, it is to be appreciated that element 50 in effect represents a mill race or a water purification plant of a city and that as long as the water contains pollutant such as oil, it is desirable to keep all water from the mill race or the plant. Thus, the use of a movable barrier which effectively stops this flow of water is desired. The movable baffle 35 does this, since it coacts with the floor 54 to form a seal substantially preventing water from getting to conduits or pipes 39. Again, visual inspection readily affords the determination when baffles 35 can be activated to allow water to pass.

The apparatus of this invention provides advantages in that a minimal number of moving parts is employed. Further, ample storage space is provided allowing operators sufficient time to effect separations, make inspections and apply such treatments as needed to break emulsions, to effect filtrations or to purify the end-product water. Still further, the apparatus of this invention provides, in effect, a plurality of separators or containers each of which can be activated or not, as desired, to withdraw processed water. Large quantities of liquids can be readily handled. The processing of such quantities can be effected in a continuous fashion with minimal interruption of water service to an industrial plant or the water supply of a city.

While the invention has been disclosed herein in connection with certain embodiments and certain structural and procedural details, it is clear that changes, modifications or equivalents can be used by those skilled in the art; accordingly, such changes within the principles of the invention are intended to be included within the scope of the claims below.

I claim:

1. A process for separating a mixture of liquids without counterflow streams or turbulence which process comprises temporarily storing a mixture of said liquids in a first container having a first chamber and a second chamber, said second chamber being adapted to receive from said first chamber by direct flow therefrom liquid having a different composition than said mixture in said first chamber; allowing said mixture in said second chamber to flow by simple gravity into a second container similar in structure to said first container; and repeating said gravity flows in seriatim through said chambers until only one component of said mixture is being obtained at a given outlet, said flows being in a straight line manner in the absence of counterflow streams or turbulence.

2. A process in accordance with claim 1 in which said mixture is a mixture of oil and water.

3. A process in accordance with claim 1 which includes the step of pumping said mixture into said first container at a rate commensurate with the separations being effected.

* * * * *